Aug. 6, 1946.  R. G. JEWELL  2,405,429
POSITION INDICATOR
Filed Dec. 10, 1943
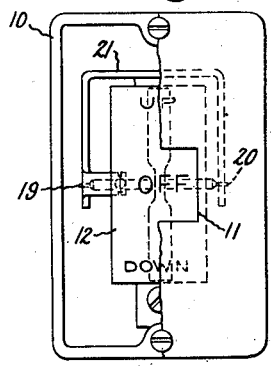
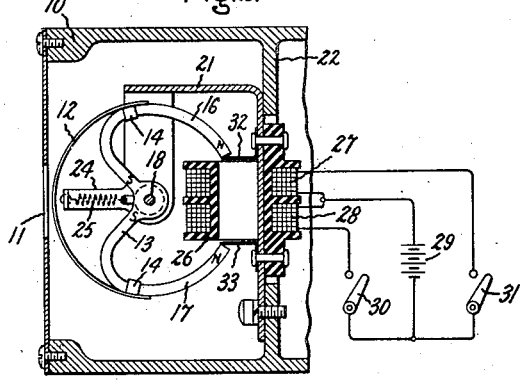
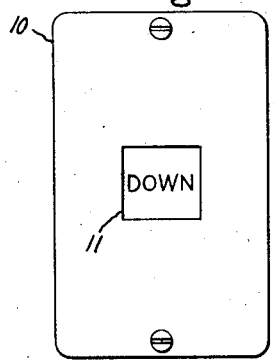
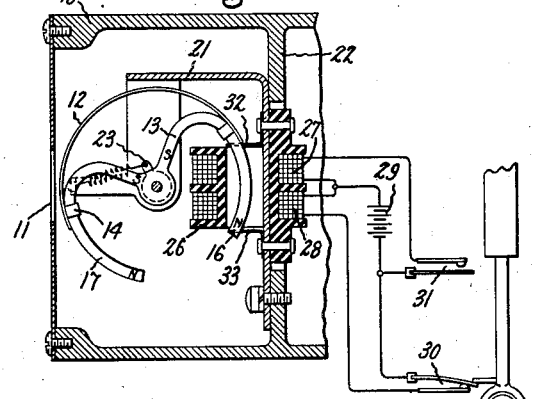
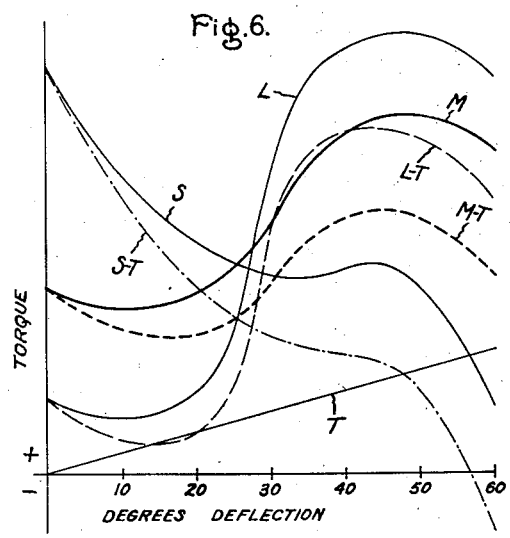
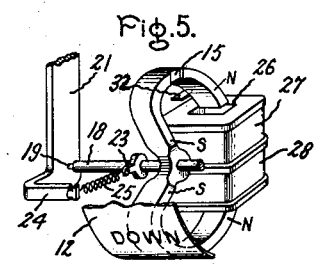
Inventor:
Richard G. Jewell,
by Harry E. Dunham
His Attorney.

Patented Aug. 6, 1946

2,405,429

UNITED STATES PATENT OFFICE 2,405,429

POSITION INDICATOR

Richard G. Jewell, Swampscott, Mass., assignor to General Electric Company, a corporation of New York Application December 10, 1943, Serial No. 513,813

5 Claims. (Cl. 177—311)

My invention relates to an electrically operated position indicator and its object is to provide such an indicator which is of rugged, compact, low cost construction, but which is highly reliable in operation. For example, my invention may be used on an airplane where there is considerable vibration and where space and weight requirements are important to indicate the position of landing wheels and the like.

The features of my invention which are believed to be novel and patentable will be pointed out in the claims appended hereto. For a better understanding of my invention, reference is made in the following description to the accompanying drawing in which Figs. 1 and 2 represent partial front and sectional side views of a preferred embodiment of my invention, with the movable indicating element in a mid-indicating position; Figs. 3 and 4 represent front and sectional side views of the same indicator with the movable indicating element in one extreme indicating position; Fig. 5 represents a perspective view of a movable permanent magnet armature member and centering spring employed in the invention; and Fig. 6 shows torque displacement curves of a device of this character for the purpose of explaining preferred dimensions and relations of parts to obtain the most satisfactory over-all torque characteristics.

Referring to the drawing, the indicator may comprise a receiver casing 10 having a front window 11 for exposing position designating markings, such as "Up," "Down," and "Off," on a rotary position indicating member within the casing and partially exposed to view through the window. The markings referred to are on the outer cylindrical surface of a lightweight, non-magnetic indicator member 12. The member 12 may be considered as one-half of a hollow open-ended cylinder and is securely fastened to a combined spider and permanent magnet armature member 13 pivoted on the axis of the half cylinder. The cylindrical surface member may be secured to the spider by metal clips 14 integral with the part 12 which securely grasp notched parts of the spider member 13. One of the notches for this purpose is shown at 15 in Fig. 5. The spider member has sector-shaped extensions 16 and 17, the outer surfaces of which have in this case the same radius of curvature as the inside of the cylindrical surface member 12, and extend beyond the extremities of such surface approximately 60 degrees of arc in the structure shown, such that the distance between their free ends is also approximately 60 degrees arc. The spider portion has a hub firmly secured to a shaft 18, which shaft is pivoted in bearings 19 and 20 in a supporting framework 21 by means of which the rotor assembly may be secured to a panel 22 which may comprise a partition in or the rear wall of the casing 10. The weight of the armature as constructed is substantially balanced about the axis of rotation. The shaft 18 also has an arm 23 extending radially therefrom between which and an extension 24 of the framework is a tension spring 25. The spring 25 is arranged to bias the rotor assembly to the central rotary position represented in Fig. 2 when moved in either direction from such position. Other suitable biasing means may be employed. When in such central rotary position, the designation "Off" appears in the window 11. The spider member 13 or at least the arc-shaped extensions 16 and 17 thereof are of permanent magnet material and permanently magnetized, with the open ends thereof of the same magnetic polarity as indicated by the designations N thereon. The south pole of these magnets may be at the hub of the spider where, as here, the spider and arc-shaped parts are made of one piece of material. It is, however, unnecessary that the radial spider portion be of permanent magnetic material, but because of the small size and amount of material involved, it is economical to make the spider and arc-shaped magnets of one piece of material. The maximum diameter of the circular rotor structure may be of the order of one inch and other dimensions in the same relative proportion represented. The indicating surface 12 may be of considerably larger diameter than the magnet circle or the indicating surface may be a large disk on the end of the shaft where exceptionally large indications are desired. Symmetrically located between the open ends of the magnets 16 and 17 when the rotor is in the center rotary position shown in Fig. 2, is a two-coil hollow spool 26 having axially displaced coils 27 and 28, the axial opening in the spool being positioned so that the arc-shaped magnets 16 and 17 may freely enter the same as represented in Fig. 4. A strap section of the framework 21 passes through the spool opening on the side away from the pivoted armature and is securely fastened thereto, so that the spool and framework 21 are secured in fixed relation to each other and to the casing part 22 as represented. The two coils are connected to a direct-current source of supply 29 through individual switches 30 and 31 and the coils are so wound that they produce fluxes in opposite directions through the axis of the coil spool. It is intended that only one coil will be energized at any one time. However, the circuit arrangement may be such that only one coil is deenergized at any one time since with both coils energized they nullify each other. When coil 27 is energized, it repels the N pole of magnet 16 and attracts the N pole of magnet 17. When coil 28 is energized, it repels the N pole of magnet 17 and attracts the N pole of magnet 16. The effect upon the permanent magnet armature member is represented in Fig. 4 where coil 28 is energized. Thus coil 28 produces a flux through its axis which is of an N polarity at its lower end and of an S polarity at its upper end, and due to the influence of this flux on the permanent magnets causes the rotor structure to turn, tending to center the magnet 16 with respect to the coil flux. The entry of magnet 16 into and through coil 28 as far as it would otherwise go is prevented by a resilient stop 32 secured to the panel and extending into the path of movement of the edge of the cylindrically surfaced indicating member 12, so that the rotary movement in a clockwise direction is limited to that shown in Fig. 4. The stop is adjustable by bending so as correctly to position the indication "Down" in the window 11, as shown in Fig. 3, when the armature member is so positioned. Likewise, there is a stop 33 against which the other edge of part 12 strikes when the armature assembly is turned counterclockwise from the central position shown in Fig. 2 when the upper coil 27 is energized, correctly to position the designation "Up" in the window 11. When the energized coil is deenergized, the spring 25 returns the armature assembly to the central position shown in Fig. 2 as it would also do if both coils were energized simultaneously.

As indicated in Fig. 4, by way of an example, the switches 30 and 31 may be operated by the raising and lowering mechanism of the landing wheel 34 of an airplane. The wheel is represented as being in the fully lowered position, closing switch 30. When the wheel is fully raised, switch 31 is closed, and when in any intermediate position, both switches are open. Thus, the position indicator indicates these different conditions by suitable markings on the indicator which appear in the window 11 under the three conditions mentioned.

In order to obtain a good angle of movement of the armature member in both directions from center so that quite large indications "On," "Off," etc., may be used on a small drum or the equivalent and to obtain good starting and holding torques, certain dimensional relations of the parts are found desirable as will be explained in connection with the curves of Fig. 6. In the device represented, I have provided for angles of deflection of approximately 60 degrees each way from mid-position, and in Fig. 6 the angular deflection in degrees one way from the center or zero position is plotted as abscissa. The ordinates represent torque and the straight line curve T represents the torque of centering spring 25. Curve L represents the electromagnetic torque of a device similar to the one pictured except that the gap between the open ends of magnets 16 and 17 is made about ⅛-inch longer than shown; for example, a device where the gap would be about 75 degrees instead of approximately 60 degrees. Curve L—T represents the resultant torque of such a device or the difference between the torque L and the spring torque T. It is seen that the resultant starting torque is quite low and the torque remains low up to about 25 degrees deflection. Such a device would be sluggish in starting and would not have the quick positive action most to be desired. Curve S represents the electromagnetic torque of a device similar to the one represented except that the gap between the ends of the magnets is made about ⅛-inch shorter than represented in the drawing, and S—T the resultant torque of such a device. Such a device would have more than sufficient starting torque but insufficient upscale torque to move the indicator to the extreme indicating position selected. The resultant torque becomes zero at about 57 degrees deflection, and the indications "Up" and "Down" would not be centered in the window opening. At 57 degrees deflection such a device would have no holding torque and even if the extreme indicating positions were made at 50 degrees deflection from mid-position, the holding torque would be unsatisfactory under the vibrating and bouncing conditions likely to be met with in an airplane.

Curve M represents the electromagnetic torque of the device dimensioned as represented in the drawing where the gap between the ends of the magnets 16 and 17 is about 60 degrees. M—T represents the resultant torque. It is seen that the device has good starting and holding resultant torques and that they are about equal and well proportioned. In other words, the starting torque on the armature assembly when in the mid-position of Fig. 2 upon energizing of one of the coils corresponds to the value shown by dotted line M—T at zero degrees, and the holding torque when in either extreme position corresponds to the value indicated by curve M—T at 60 degrees. The device will therefore have quick, nonsluggish action and is unlikely to be influenced by bouncing or vibration of the plane, or by a low voltage battery condition when in either of the energized or extreme indicating positions.

It will be noted that the over-all length of the coil spool has been made substantially as great as possible for the 60-degree angle of deflection and the 180-degree peripheral length of cylindrical indicating surface 12 employed. If the coil spool were made any longer, its ends would serve as the stops 31 and 32. While this is possible, I prefer to provide the additional stop devices which are made to have some slight resiliency and can be adjusted as described. It is also desirable to have the total length of the spool less than the length of magnet gap for assembly purposes. It is also noted that the internal diameter of the coil spool has been made about as small as feasible to accommodate the curved armature members and the holding strap, while the external diameter could not be greatly increased and still leave room for the spider and shaft assembly. The coils are designed to be continuously energized without injury. The structural design and dimensional relations shown and described were arrived at with a view of obtaining a compact, rugged, lightweight, easily assembled, low cost, but highly reliable and efficient device.

What I claim as new and desire to secure by Letters Patent of the United States is:

1. In a position indicator, a spool having a pair of hollow cylindrical coils closely spaced end-to-end with their axes in line adapted to be separately energized by direct current, the coil connections being such that the two coils produce fluxes in opposite directions, a rotary armature position indicating member having a pair of sector-shaped permanent magnet parts arranged in the arc of a circle about the axis of rotation of the armature and each being of at least 60 degrees arc length with poles of like polarity facing each other across a gap of approximately 60 degrees arc, means for biasing said armature member to a central rotary position with the aforesaid spaced pole pieces adjacent opposite ends of said spool such that when the armature is turned the sector-shaped magnet parts can pass into the hollow coils, the relative polarity of said magnets and coils when energized being such that when a coil is energized it repels the nearer magnet and attracts the other magnet and causes the armature to turn from the central position accordingly, and means for stopping the rotary movement of said armature when it has rotated approximately 60 degrees from central position in either direction.

2. A position indicator comprising a rotary armature indicating member having two sector-shaped permanent magnet parts each of at least 60 degrees arc length and arranged in the arc of a circle about the axis of rotation of the member with poles of like polarity spaced from each other by a gap of approximately 60 degrees arc length, means for biasing said armature member to a central rotary position when rotated in either direction therefrom, a hollow coil spool having a pair of reversely wound energizing coils occupying opposite end halves thereof, said coil spool being of such dimensions that it can be inserted in the aforesaid gap to a position to allow the ends of the sector-shaped magnet parts to pass through the coils when the armature member is rotated in opposite directions from such central position, means for securing said spool in such position with the spool symmetrical with respect to the central rotary position of the armature member, said coils being adapted to be separately energized at different times by direct current and both to be deenergized at other times, the energizing of the coils on said spool causing the sector-shaped magnet nearer the coil which is energized to be repelled and the other magnet to be attracted to produce corresponding directional rotation of said armature member from the central position, and means for limiting the rotary movements of said armature member from a central position to angles of approximately 60 degrees while said moving magnetic forces are still appreciable whereby they become holding forces.

3. A position indicator having an integral spider and double permanent magnet rotary armature member made of permanent magnet material, the double armature member consisting of two sector-shaped parts of approximately 60 degrees arc length and arranged in the arc of a circle about the axis of rotation of the armature member with one end of each bent inward to form the spider and the other ends extending toward each other with a gap of approximately 60 degrees arc between them, said member being permanently magnetized so that the spaced ends of the sector-shaped parts are of the same polarity, means for rotatively supporting said armature member on its axis of rotation, means for biasing the same to a central rotary position when moved in either direction from such position, and a double coil stationary hollow spool member the over-all length of which does not exceed the length of said gap symmetrically positioned within the gap between the ends of said sector-shaped armature parts when the armature is in its central position with the coils coaxial at opposite ends of the spool and with the hollow axial space of said spool in line with said sector parts whereby when the armature is rotated in opposite directions the ends of said sector-shaped parts can enter and freely pass through the coils, said coils being adapted to be separately energized with direct current to produce fluxes of opposite polarity for the purpose of rotating said armature member in opposite directions from its central position.

4. A position indicator comprising a rotary member having an indicating surface part formed in the shape of one-half of a hollow cylinder, means for rotatively supporting said member on an axis coinciding with the axis of such a cylinder, a pair of sector-shaped permanent magnets secured on said rotary member and arranged in the arc of a circle with respect to its axis of rotation in arcs, each of approximately 60 degrees, adjacent that occupied by the one-half cylinder indicating surface part such that there remains an open gap between the ends of the permanent magnets of approximately 60 degrees arc, said magnets being polarized to have like poles facing each other across said gap, means for biasing said rotary member to a central rotary position when rotated in either direction from such position, a pair of reversely wound stationary hollow coaxial coils positioned end-to-end within and occupying substantially but not more than the entire gap space between the sector-shaped permanent magnets when the rotary member is in its central position with the axis of said coils in alignment with the sector-shaped magnets such that the magnets may freely enter the coils when the rotary member is rotated from its central position, said coils being adapted to be individually energized with direct current such that the magnet which is nearer the coil which is energized is repelled and the other magnet is attracted causing rotation of the rotary member from the central position, and means for limiting rotary movements of said rotary member to approximately 60 degrees from the central position, the resultant torque tending to produce rotation of said rotary member being substantial and approximately the same in its central and extreme rotary positions when either coil is energized whereby said rotary member has quick operation and good holding torque.

5. An electromagnetic position indicator having similar, coaxial first and second stationary hollow coils and a rotor member having first and second sector-shaped permanent magnet armature members, the armature members being relatively positioned as segments of the same circle and pivoted for rotation about the center of such circle, said coils being positioned relative to said rotor member so that said circle passes tangentially through the axial space of said coils such that either magnet may thread either hollow coil, means for biasing said rotor member to a central position where the magnets are symmetrically located with respect to and entirely outside the coils, said coils being adapted to be alternately energized with direct current such that the first coil will attract the second magnet and repel the other to produce rotation of the rotor member in one direction from the central position and the second coil will attract the first magnet and repel the other to produce rotation in the opposite direction from the central position.

RICHARD G. JEWELL.